Patented Oct. 31, 1944

2,361,541

UNITED STATES PATENT OFFICE 2,361,541

PROCESS FOR THE MANUFACTURE OF COLOR PHOTOGRAPHIC IMAGES

Béla Gáspár, Hollywood, Calif., assignor to Chromogen, Incorporated, a corporation of Nevada No Drawing. Application August 8, 1940, Serial No. 351,907. In Great Britain August 9, 1939

8 Claims. (Cl. 95—6)

The present invention relates to the production of dye images from photographic silver images by a process which comprises the synthesis of an azo dye in the exposed photographic emulsion layer.

In my prior United States Letters Patent No. 2,071,688 dated February 23, 1937, I have described and claimed a method of producing color photographic images in which the photographic layer is subjected to two treatments, the first treatment consisting in the conversion of a dye-forming substance into a dye and the second treatment consisting in the local dye destruction at the required points. Thus, for example, a diazo compound is transformed into an azo dye by coupling with a phenol; or a phenol or other azo coupler is transformed into an azo dye by treating with a diazo compound, the azo dyes thus formed then being destroyed locally.

In my prior British patent specification No. 416,660 I have described and claimed an alternative process in which the first treatment consists in the local destruction of the dye-forming substance, the second treatment then consisting in the conversion of the remaining dye-forming substance into the dye.

If, for carrying out the processes referred to above, a layer is used which contains only an azo coupler or only a diazo compound the production of the dye image includes only the coupling with a diazo compound or the coupling with an azo coupler, respectively, and the destruction at the image or non-image parts of the dye thereby obtained.

If, however, the layer contains a diazotizable amino compound and an azo coupler, the process includes diazotization, coupling and destruction at the image or non-image parts of either the diazo compound or the dye.

The present invention relates to the treatment of photographic layers that either comprise both a diazotizable amino compound and a compound that is capable of coupling with diazo compounds or that comprise a compound which is both diazotizable and then capable of coupling with itself. The operations of diazotization, coupling and destruction at the image or non-image parts are not carried out in three separate treating steps but with only two baths or even with one single bath.

This simplification of the process is rendered possible by the present invention which consists in imparting a triple function to the treating solution or a dual function to one of two treating solutions so that the same treating solution is capable of bringing about diazotization, coupling and destruction at the image or non-image parts or at least two of these effects. Different possibilities of carrying out the invention are illustrated by the following examples.

*Example 1.*—A photographic layer comprising a metallic silver image and the substance (p-aminobenzoyl) - p - amino - benzoyl - 1 - amino - 8 - naphthol-3.6-disulphonic acid having the following structural formula

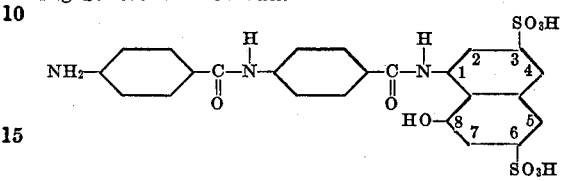

which is distributed diffusely throughout the layer is treated for about 5 minutes with a solution of 250 ccs. of a 0.25-normal sulphuric acid and 1 cc. of a 0.1 normal-sodium nitrite solution. The image is washed and immersed for about 5 minutes into a 2.5% thiocarbamide solution containing 2% acetic acid which causes coupling of the diazotized amino compound simultaneously with destruction at the image parts. The silver image is thereafter removed in the usual manner by bleaching with cupric chloride solution and fixing. A red dye image is obtained.

*Example 2.*—An image as used in Example 1 is treated with a solution of 20 ccs. 0.1-normal acetic acid with the addition of 0.1 cc. of a 0.1-normal sodium nitrite solution. Diazotization and coupling and the formation of an image occur within the same solution. After about 10 to 20 minutes the silver is removed from the dye image. The dye image can be improved by treating the layer prior to the removal of the silver with a dye destroying solution, such as a 5% hydrobromic acid solution.

*Example 3.*—A silver image as used in Example 1 is treated with a solution of 20 ccs. ½-normal acetic acid containing 5% sodium chloride and 0.1 cc. of a 0.1-normal sodium nitrite solution. After 20 minutes the silver image is removed by a cupric salt solution and fixing; a dye image is obtained.

*Example 4.*—A silver image as used in Example 1 is treated with 25 ccs. of a solution of 0.25-normal hydrobromic acid to which 0.1 cc. of a 0.1-normal sodium nitrite solution have been added which acts to diazotize and to destroy the diazonium compound at the points of the silver image. The layer is after-treated with a 0.25-normal sodium carbonate to cause the diazotized compound to couple. The silver is removed and a dye image obtained.

From the foregoing examples it will be seen that the triple function of diazotizing, coupling and destruction of the dye or dye-forming substance is given to one single treating solution, or that two of these functions are given to the one of two treating baths employed in the examples.

Instead of the coupling component used in the examples other components may be used; for example, a mixture of a diazotizable amino compound, such as Diazo Light Yellow, and a coupling compound, such as carbonyl - bis - {8 - [4 - (4 - amino-benzamino) - benzamino] - naphthol - (1)-disulphonic acid (3.6)}, (Beilstein's Handbuch der organischen Chemie, 4th ed., 1933, suppl. vol. XIV, page 759, formula XI on page 758), may be used which are distributed diffusely throughout a layer.

The process of the present invention for the production of color photographic images is especially useful for the manufacture of multi-color images in a plurality of layers. In the multilayer material used for this process some or all of the layers may contain a dye-forming substance capable of coupling with itself or some or all of the layers may contain a diazotizable amino compound and a compound that is capable of coupling with diazo compounds.

I claim:
1. A process for producing a photographic dyestuff image in a layer comprising a silver image and a diazotizable amine distributed diffusely throughout the layer which may be formed into a dye comprising the treatment of said layer with a single solution which causes a dye to be formed and an image to be formed in said layer by said dye, said solution comprising nitrous acid and an agent which is non-destructive with respect to the dye but reacts with the said silver image to oxidize it and substantially simultaneously to form a reducing substance which destroys or prevents formation of said dye at the points of the silver image.

2. A process for producing a photographic dyestuff image in a layer comprising a silver image and a diazotizable amine distributed diffusely throughout said layer capable of coupling with itself to form a dye comprising the treatment of said layer with a single solution which causes said amine to couple to form a dye and an image to be formed in said layer by said die, said solution comprising nitrous acid and an agent which is non-destructive with respect to the dye but reacts with the said silver image to oxidize it and substantially simultaneously to form a reducing substance which destroys or prevents formation of said dye at the points of the silver image.

3. A process for producing a photographic dyestuff image in a layer comprising a silver image together with a diazotizable amino compound and a compound that is capable of coupling with diazo compounds to form a dye both of said compounds being distributed diffusely throughout said layer, comprising the treatment of said layer with a single solution which causes said compounds to couple to form a dye and an image to be formed in said layer by said dye, said solution comprising nitrous acid and an agent which is non-destructive with respect to the dye but reacts with the said silver image to oxidize it and substantially simultaneously to form a reducing substance which destroys or prevents formation of said dye at the points of the silver image.

4. A process for producing a photographic dyestuff image in a layer comprising a silver image and (p - aminobenzoyl) - p - amino - benzoyl -1 - amino - 8 - naphthol - 3.6 - disulphonic acid distributed diffusely throughout said layer comprising the treatment of said layer with a single solution which causes said (p-aminobenzoyl-p-amino - benzoyl - 1 - amino - 8 - naphthol - 3.6 - disulphonic acid to couple with itself to form a dye and an image to be formed in said layer by said dye, said solution comprising nitrous acid and an agent which is non-destructive with respect to the dye but reacts with the said silver image to oxidize it and substantially simultaneously to form a reducing substance which destroys or prevents formation of said dye at the points of the silver image.

5. A process for producing a photographic dyestuff image in a layer comprising a silver image together with Diazo Light Yellow and carbonyl-bis - {8 - [4 - (4 - amino-benzamino) - benzamino] - naphthol - (1) - disulphonic acid (3.6)} both of which are distributed diffusely throughout the layer comprising the treatment of said layer with a single solution which causes the Diazo Light Yellow and carbonyl-bis-{8-[4-(4-amino - benzamino) - benzamino] - napthol - (1)-disulphonic acid (3.6)} to couple to form a dye and an image to be formed in said layer by said dye, said solution comprising nitrous acid and an agent which is non-destructive with respect to the dye but reacts with the said silver image to oxidize it and substantially simultaneously to form a reducing substance which destroys or prevents formation of said dye at the points of the silver image.

6. A process for producing a photographic dyestuff image in a layer comprising a silver image together with a compound uniformly distributed throughout said layer which is both diazotizable and then capable of coupling with itself to form a dye comprising treating said layer with a solution which causes said compound to be diazotized and couple with itself to form a dye simultaneously with the destruction of said dye or the diazo compound at the image parts, said solution comprising nitrous acid and an agent which is non-destructive with respect to the dye but reacts with the said silver image to oxidize it and substantially simultaneously to form a reducing substance which destroys or prevents formation of said dye at the points of the silver image.

7. A process for producing a photographic dyestuff image in a layer comprising a silver image and (p - aminobenzoyl) - p - amino - benzoyl - 1 - amino - 8 - naphthol - 3.6 - disulphonic acid distributed diffusely throughout said layer which comprises treating said layer with a solution which causes the (p-aminobenzoyl-p-amino-benzoyl-1-amino-8-naphthol-3.6-disulphonic acid to be diazotized and to couple with itself to form a dye simultaneously with the destruction of said dye or the diazo compound at the image parts, said solution comprising nitrous acid and an agent which is non-destructive with respect to the dye but reacts with the said silver image to oxidize it and substantially simultaneously to form a reducing substance which destroys or prevents formation of the dye at the points of the silver image.

8. A process for producing a photographic dyestuff image in a layer comprising a silver image together with Diazo Light Yellow and carbonyl-bis - {8 - [4 - (4 - amino - benzamino) - benzamino] - naphthol - (1) - disulphonic acid (3.6)} which are distributed diffusely throughout the layer which comprises treating said layer with a solution which causes the Diazo Light Yellow to be diazotized and couple with the carbonyl-bis-{8 - [4 - (4 - amino - benzamino) - benzamino] - naphthol-(1)-disulphonic acid (3.6)} to form a dye simultaneously with the destruction of said dye or the diazotized Diazo Light Yellow at the image parts, said solution comprising nitrous acid and an agent which is non-destructive with respect to the dye but reacts with the said silver image to oxidize it and substantially simultaneously to form a reducing substance which destroys or prevents formation of said dye at the points of the silver image.

BÉLA GÁSPÁR.